(12) United States Patent
Akutsu et al.

(10) Patent No.: US 10,626,814 B2
(45) Date of Patent: Apr. 21, 2020

(54) CONTROL DEVICE AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Tomokazu Akutsu, Nagakute (JP); Takashi Nakamura, Toyota (JP); Noriyasu Kobashi, Hachioji (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/142,566

(22) Filed: Sep. 26, 2018

(65) Prior Publication Data
US 2019/0107067 A1 Apr. 11, 2019

(30) Foreign Application Priority Data

Oct. 6, 2017 (JP) .................... 2017-196212

(51) Int. Cl.
*F01N 9/00* (2006.01)
*F02D 41/02* (2006.01)
(Continued)

(52) U.S. Cl.
CPC ......... *F02D 41/029* (2013.01); *F01N 3/0253* (2013.01); *F01N 9/002* (2013.01); *F02D 41/0082* (2013.01); *F02D 41/025* (2013.01); *F02D 41/1408* (2013.01); *F02D 41/1454* (2013.01); *F02D 41/1475* (2013.01); *F02D 41/2422* (2013.01); *F01N 2430/06* (2013.01); *F01N 2560/025* (2013.01); *F01N 2560/08* (2013.01); *F01N 2900/0408* (2013.01);
(Continued)

(58) Field of Classification Search
CPC .. F02D 41/0082; F02D 41/0085; F01N 9/002; F01N 2430/08
See application file for complete search history.

(56) References Cited

U.S. PATENT DOCUMENTS

| 8,341,947 B2 | 1/2013 | Hepburn et al. |
| 2011/0073088 A1 | 3/2011 | Hubbard et al. |

(Continued)

FOREIGN PATENT DOCUMENTS

| DE | 10 2016 110 632 A1 | 12/2017 |
| EP | 2 511 491 A1 | 10/2012 |

(Continued)

*Primary Examiner* — Jonathan R Matthias
(74) *Attorney, Agent, or Firm* — Finnegan, Henderson, Farabow, Garrett & Dunner, LLP (57) ABSTRACT

A control device for an internal combustion engine includes an electronic control unit configured to execute dither control processing in a first mode and a second mode. The dither control processing is processing for operating a fuel injection valve such that an air-fuel ratio of at least one cylinder among cylinders becomes lean air-fuel ratio, and an air-fuel ratio of cylinders different from the at least one cylinder becomes rich air-fuel ratio when a condition that a regeneration request of the filter occurs is established. In the second mode, an absolute value of the difference between the air-fuel ratio in the lean combustion cylinder and the air-fuel ratio in the rich combustion cylinder smaller than in the first mode.

5 Claims, 5 Drawing Sheets

(51) Int. Cl.
*F02D 41/24* (2006.01)
*F02D 41/14* (2006.01)
*F02D 41/00* (2006.01)
*F01N 3/025* (2006.01)

(52) U.S. Cl.
CPC .. *F01N 2900/08* (2013.01); *F01N 2900/1402* (2013.01); *F01N 2900/1602* (2013.01); *F01N 2900/1606* (2013.01); *F02D 2200/0802* (2013.01); *F02D 2200/101* (2013.01); *F02D 2200/1002* (2013.01)

(56) References Cited

U.S. PATENT DOCUMENTS

| | | |
|---|---|---|
| 2016/0123200 A1 | 5/2016 | Ramappan et al. |
| 2017/0284269 A1 | 10/2017 | Myojo et al. |
| 2019/0032585 A1* | 1/2019 | Kelly ................ B01D 46/0063 |

FOREIGN PATENT DOCUMENTS

| | | |
|---|---|---|
| FR | 2920030 A3 | 2/2009 |
| JP | 2004-218541 | 8/2004 |
| JP | 2006-183636 A | 7/2006 |
| JP | 2009-036183 | 2/2009 |
| JP | 2012-057492 A | 3/2012 |

* cited by examiner

CONTROL DEVICE AND CONTROL METHOD FOR INTERNAL COMBUSTION ENGINE

INCORPORATION BY REFERENCE

The disclosure of Japanese Patent Application No. 2017-196212 filed on Oct. 6, 2017 including the specification, drawings and abstract is incorporated herein by reference in its entirety.

BACKGROUND

1. Technical Field

The present disclosure relates to a control device and a control method for an internal combustion engine including a plurality of cylinders, a filter configured to trap particulate matter in exhaust gas discharged from the cylinders, and a fuel injection valve provided in each of the cylinders.

2. Description of Related Art

For example, Japanese Unexamined Patent Application Publication No. 2009-36183 (JP 2009-36183 A) describes that a filter configured to trap particulate matter in exhaust gas is provided in an exhaust passage of an internal combustion engine. JP 2009-36183 A describes that the filter is set at a high temperature for regeneration processing of the filter for eliminating the particulate matter trapped on the filter from the filter.

Japanese Unexamined Patent Application Publication No. 2004-218541 (JP 2004-218541 A) describes a control device that, in a case where there is a temperature increase request of a catalyst device (catalyst), executes dither control such that at least one cylinder becomes a rich combustion cylinder having an air-fuel ratio richer than a stoichiometric air-fuel ratio, and remaining cylinders become a lean combustion cylinder having an air-fuel ratio leaner than the stoichiometric air-fuel ratio.

SUMMARY

In order to increase the temperature of the filter for the regeneration processing of the filter, the execution of the dither control has been examined. In this case, in a case where the dither control ends based on an increase in the temperature of the filter to a temperature range appropriate for the regeneration processing region through the dither control, the temperature of the filter decreases, and may fall below the temperature range appropriate for the regeneration processing.

The disclosure provides a control device and a control method for an internal combustion engine capable of restraining a temperature of a filter from falling below a temperature range appropriate for regeneration processing at the time of filter regeneration processing.

A first aspect of the disclosure relates to a control device for an internal combustion engine. The internal combustion engine includes a plurality of cylinders, a filter configured to trap particulate matter in exhaust gas discharged from the cylinders, and a fuel injection valve provided in each of the cylinders. The control device includes an electronic control unit. The electronic control unit is configured to execute dither control processing. The dither control processing includes a first mode, and a second mode that is executed after the first mode. The dither control processing is processing for operating the fuel injection valve such that at least one cylinder among the cylinders becomes a lean combustion cylinder having an air-fuel ratio leaner than a stoichiometric air-fuel ratio, and cylinders different from the at least one cylinder among the cylinders become a rich combustion cylinder having an air-fuel ratio richer than the stoichiometric air-fuel ratio when a condition that a regeneration request of the filter occurs is established. In the second mode, an absolute value of the difference between the air-fuel ratio in the lean combustion cylinder and the air-fuel ratio in the rich combustion cylinder is smaller than in the first mode.

In the first aspect of the disclosure, since the absolute value of the difference between the air-fuel ratio in the lean combustion cylinder and the air-fuel ratio in the rich combustion cylinder in the first mode is greater than in the second mode, a temperature increase effect of the filter is large. For this reason, it is possible to appropriately meet the temperature increase request of the filter. However, in a case where the temperature of the filter increases to the temperature range appropriate for the regeneration processing and the dither control processing itself is stopped, the temperature of the filter may fall below the temperature range appropriate for the regeneration processing, and the regeneration processing of the filter may not be appropriately executed. In the first aspect of the disclosure, after the first mode, as the dither control processing of the second mode, the dither control processing with the absolute value of the difference between the air-fuel ratio in the lean combustion cylinder and the air-fuel ratio in the rich combustion cylinder smaller than in the first mode is executed. According to the dither control processing of the second mode, since the temperature increase effect, though smaller than in the first mode, is obtained, it is possible to suppress the occurrence of a situation in which the temperature of the filter falls below a temperature range appropriate for the regeneration processing.

In the control device according to the first aspect of the disclosure, the dither control processing may be processing for providing a period during which the at least one cylinder among the cylinders becomes a lean combustion cylinder having an air-fuel ratio leaner than the stoichiometric air-fuel ratio and cylinders different from the at least one cylinder among the cylinders becomes a rich combustion cylinder having an air-fuel ratio richer than the stoichiometric air-fuel ratio, and controlling an average value of exhaust gas air-fuel ratios in a predetermined period including the period to a target air-fuel ratio. The average value in the second mode may be leaner than the average value in the first mode.

In the second mode, since the average value of the exhaust gas air-fuel ratios is leaner, in a case where the absolute value of the difference between the air-fuel ratio in the rich combustion cylinder and the air-fuel ratio in the lean combustion cylinder is the same as in the first mode, the air-fuel ratio in the lean combustion cylinder may reach a lean-side misfire limit. In contrast, in the first aspect of the disclosure, since the absolute value of the difference in the second mode is smaller than in the first mode, it is possible to restrain the air-fuel ratio of the lean combustion cylinder in the second mode from becoming the lean-side misfire limit.

In the control device according to the first aspect of the disclosure, the dither control processing may include processing for variably setting the difference between the air-fuel ratio in the lean combustion cylinder and the air-fuel ratio in the rich combustion cylinder using map data with a rotation speed of a crankshaft of the internal combustion engine (hereinafter, simply referred to as a "rotation speed") and a load of the internal combustion engine (hereinafter, simply referred to as a "load") as input variables. The map data may include map data for the first mode and map data for the second mode.

In a case where an operation point that is determined by the rotation speed of the crankshaft of the internal combustion engine and the load of the internal combustion engine varies, even though the absolute value of the difference between the air-fuel ratio in the rich combustion cylinder and the air-fuel ratio in the lean combustion cylinder is the same, the temperature increase effect through the dither control processing may vary. For this reason, the difference between the air-fuel ratio in the rich combustion cylinder and the air-fuel ratio in the lean combustion cylinder is variably set according to the rotation speed of the crankshaft of the internal combustion engine and the load of the internal combustion engine, whereby it is possible to make the temperature increase effect of the dither control processing appropriate regardless of the operation point of the internal combustion engine.

In particular, in the first aspect of the disclosure, the difference is variably set using the map data for the first mode in the first mode, and the difference is variably set using the map data for the second mode in the second mode. For this reason, in comparison with a case where a value determined using the map data for the first mode is reduced at a predetermined reduction ratio with respect to the second mode, in regard to an operation point where the difference between the average value of the exhaust gas air-fuel ratios determined by the map data for the first mode and the lean-side misfire limit is large, it is possible to make the absolute value of the difference in the second mode large, thereby increasing the temperature increase effect.

In the control device according to the first aspect of the disclosure, the electronic control unit may be configured to execute temperature acquisition processing for acquiring a temperature of the filter. The dither control processing may include switching processing for switching from the first mode to the second mode when a condition that the temperature of the filter becomes a predetermined temperature is established.

In the first aspect of the disclosure, since switching to the second mode is performed when the predetermined temperature is reached, the predetermined temperature is set to a temperature within a temperature range appropriate for the regeneration processing, whereby it is possible to execute the dither control processing with a high temperature increase effect until the temperature of the filter falls within the temperature range appropriate for the regeneration processing. For this reason, it is possible to make the temperature of the filter quickly reach the temperature range appropriate for the regeneration processing.

In the control device according to the first aspect of the disclosure, the electronic control unit may be configured to execute the dither control processing when a condition that an execution command signal of regeneration processing of the filter is input to repair the filter from the outside of the electronic control unit is established.

In the first aspect of the disclosure, since the dither control processing is executed on a condition that the execution command signal of the regeneration processing of the filter is input to repair the filter, the average value of the exhaust gas air-fuel ratios is easily controlled to be leaner than the stoichiometric air-fuel ratio compared to during normal use of the user. Since rotational fluctuation of the crankshaft is easily permitted to be made large, in particular, in the first mode, it is possible to make the absolute value of the difference between the air-fuel ratio in the rich combustion cylinder and the air-fuel ratio in the lean combustion cylinder large.

A second aspect of the disclosure relates to a control method for an internal combustion engine. The internal combustion engine includes a plurality of cylinders, a filter configured to trap particulate matter in exhaust gas discharged from the cylinders, and a fuel injection valve provided in each of the cylinders. The control method includes: executing, by an electronic control unit, dither control processing in a first mode; and executing, by the electronic control unit, a second mode after the execution of the dither control processing in the first mode. The dither control processing is processing for operating the fuel injection valve such that at least one cylinder among the cylinders becomes a lean combustion cylinder having an air-fuel ratio leaner than a stoichiometric air-fuel ratio, and cylinders different from the at least one cylinder among the cylinders become rich combustion cylinder having an air-fuel ratio richer than the stoichiometric air-fuel ratio when a condition that a regeneration request of the filter occurs is established. In the second mode, an absolute value of the difference between the air-fuel ratio in the lean combustion cylinder and the air-fuel ratio in the rich combustion cylinder is smaller than in the first mode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of a control device for an internal combustion engine will be described referring to the drawings. In an internal combustion engine 10 shown in FIG. 1, air sucked from an intake passage 12 flows into a combustion chamber 16 of each of cylinders #1 to #4 through a turbocharger 14. Each of the cylinders #1 to #4 is provided with a fuel injection valve 18 that injects fuel, and an ignition device 20 that causes spark discharge. In the combustion chamber 16, an air-fuel mixture of air and fuel is supplied for combustion, and the air-fuel mixture supplied for combustion is discharged as exhaust gas to an exhaust passage 22. In the exhaust passage 22 downstream of the turbocharger 14, a three-way catalyst 24 having oxygen storage ability is provided. In the exhaust passage 22 downstream of the three-way catalyst 24, a gasoline particulate filter (hereinafter, referred to as a "GPF") 26 is provided.

Figure 1:
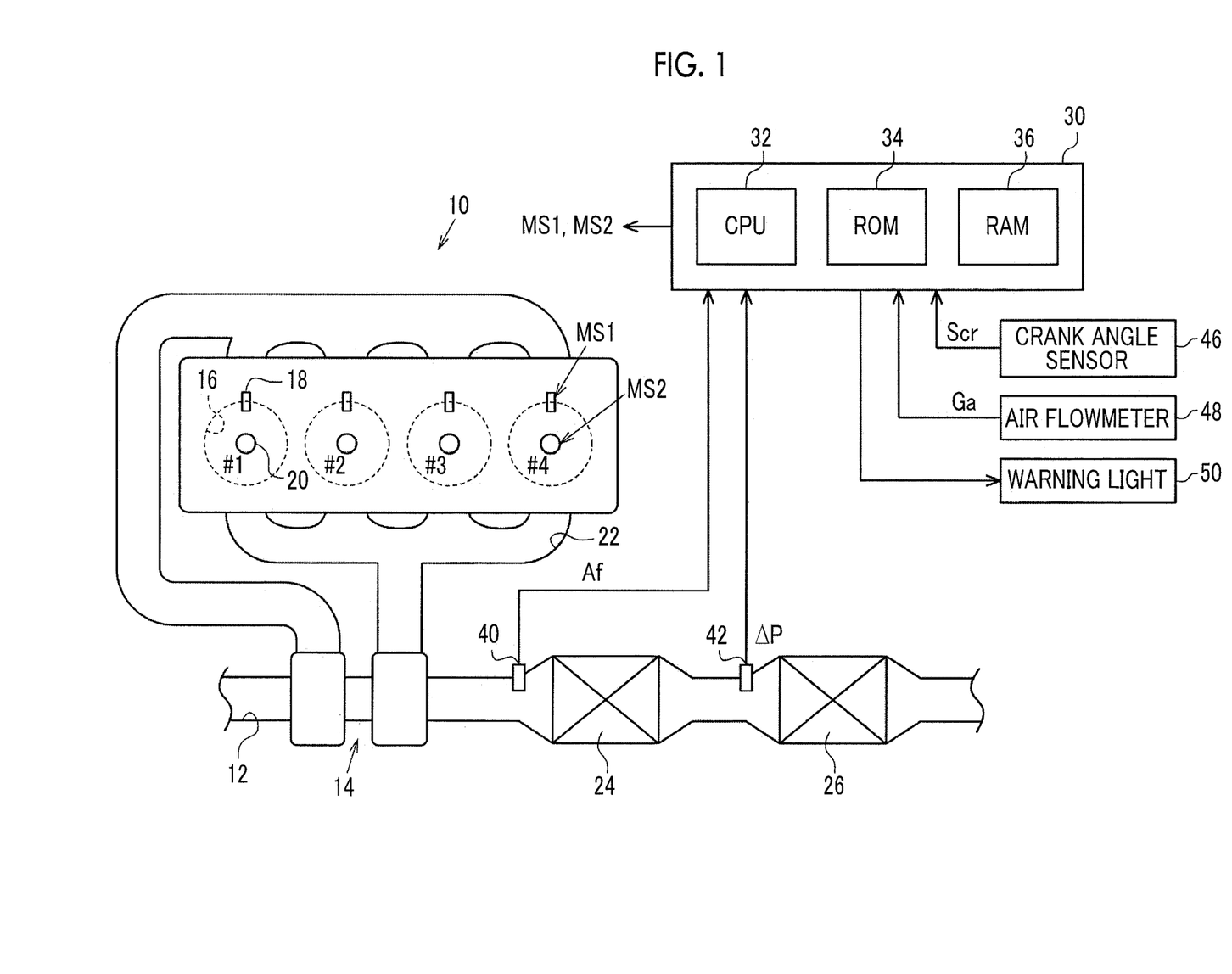
FIG. 1 is a diagram showing a control device and an internal combustion engine according to an embodiment.

An electronic control unit 30 adapts the internal combustion engine 10 as a control target, and operates an operating unit of the internal combustion engine 10, such as the fuel injection valve 18 or the ignition device 20, in order to control a control amount (torque, exhaust gas component, or the like) of the internal combustion engine 10. At this time, the electronic control unit 30 refers an air-fuel ratio Af detected by an air-fuel ratio sensor 40 upstream of the three-way catalyst 24 or a difference pressure ΔP between pressure upstream of the GPF 26 and atmospheric pressure detected by a difference pressure sensor 42. The difference pressure ΔP corresponds to the difference between pressure upstream of the GPF 26 and pressure downstream of the GPF 26, and becomes positive in a case where upstream pressure exceeds atmospheric pressure. The electronic control unit 30 refers to an output signal Scr of a crank angle sensor 46 or an intake air amount Ga detected by an air flowmeter 48. The electronic control unit 30 includes a central processing unit (CPU) 32, a read only memory (ROM) 34, and a random access memory (RAM) 36, and executes control of the control amount by the CPU 32 executing a program stored in the ROM 34.

Figure 2:
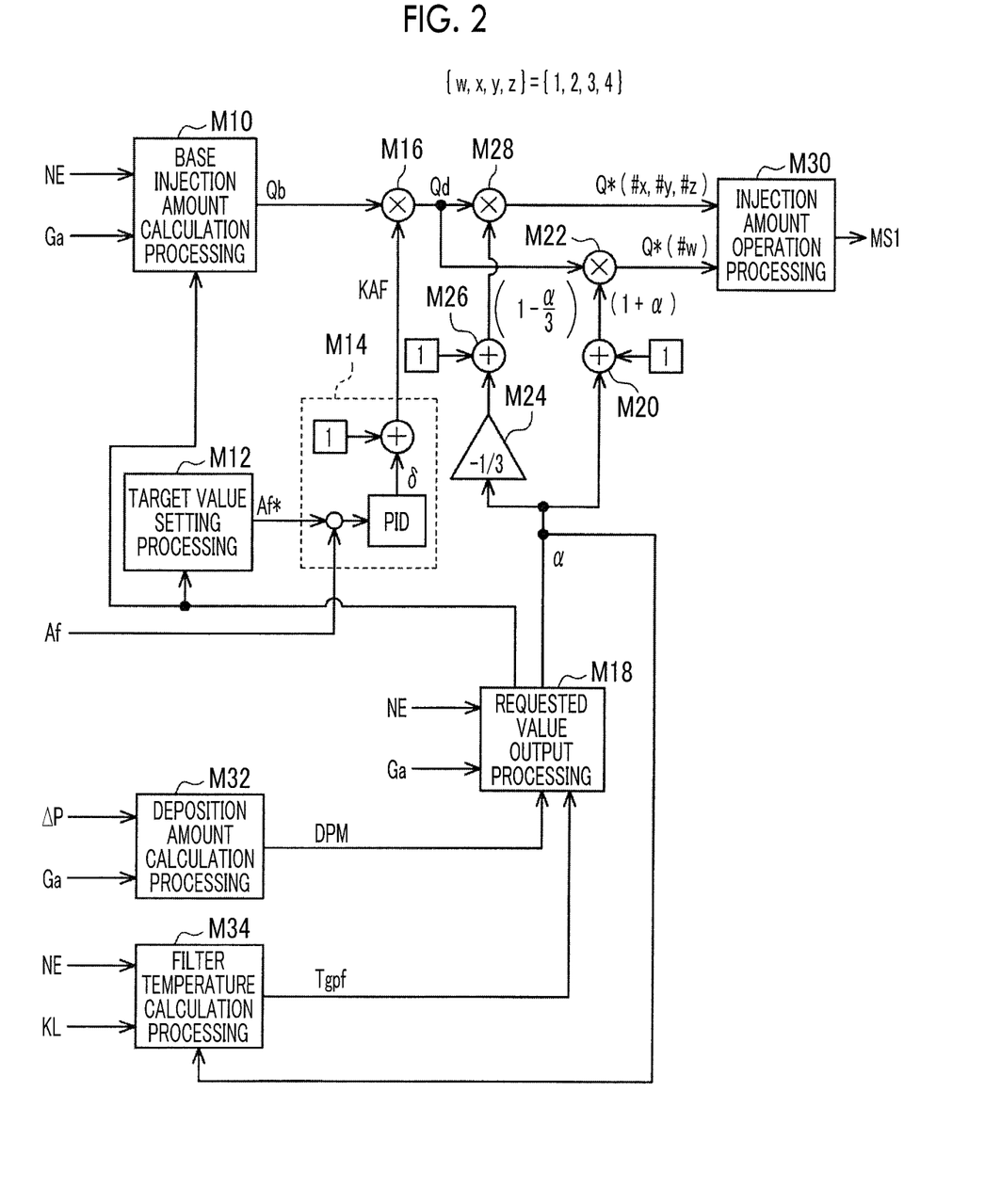
FIG. 2 is a block diagram showing a part of processing that the control device according to the embodiment executes.

FIG. 2 shows a part of processing that is realized by the CPU 32 executing the program stored in the ROM 34. Base injection amount calculation processing M10 is processing for calculating, based on the rotation speed NE calculated according to the output signal Scr of the crank angle sensor 46 and the intake air amount Ga, a base injection amount Qb as an open loop operation amount that is an operation amount for controlling an air-fuel ratio of the air-fuel mixture in the combustion chamber 16 to a target air-fuel ratio in an open loop.

Target value setting processing M12 is processing for setting a target value Af* of a feedback control amount for controlling the air-fuel ratio of the air-fuel mixture in the combustion chamber 16 to the target air-fuel ratio. Feedback processing M14 is processing for calculating a feedback operation amount KAF to execute feedback control of the air-fuel ratio Af as the feedback control amount to the target value Af*. In the embodiment, the sum of output values of a proportional element, an integral element, and a differential element with the difference between the target value Af* and the air-fuel ratio Af as input is set as a correction ratio δ of the base injection amount Qb, and the feedback operation amount KAF is set to "1+δ".

Requested injection amount calculation processing M16 is processing for multiplying the base injection amount Qb by the feedback operation amount KAF to correct the base injection amount Qb, and calculating a requested injection amount Qd. Request value output processing M18 is processing for calculating and outputting an injection amount correction request value α of dither control for, while making components of the whole exhaust gas discharged from the cylinders #1 to #4 of the internal combustion engine 10 be equivalent to a case where the air-fuel ratio of the air-fuel mixture to be a combustion target in all of the cylinders #1 to #4 is set as a target air-fuel ratio, making the air-fuel ratio of the air-fuel mixture to be a combustion target different among the cylinders. In the dither control according to the embodiment, one cylinder among the first cylinder #1 to the fourth cylinder #4 becomes a rich combustion cylinder having the air-fuel ratio of the air-fuel mixture richer than a stoichiometric air-fuel ratio, and the remaining three cylinders become a lean combustion cylinder having the air-fuel ratio of the air-fuel mixture leaner than the stoichiometric air-fuel ratio. An injection amount in the rich combustion cylinder is set to be "1+α" times the requested injection amount Qd, and an injection amount i the lean combustion cylinder is set to be "1−(α/3)" times the requested injection amount Qd. According to the settings of the injection amounts of the lean combustion cylinder and the rich combustion cylinder, since the amount of air filled in each of the cylinders #1 to #4 is the same, the components of the whole exhaust gas discharged from the cylinders #1 to #4 of the internal combustion engine 10 can be equivalent to a case where the air-fuel ratio of the air-fuel mixture to be a combustion target in all of the cylinders #1 to #4 is set as a target air-fuel ratio. According to the settings of the injection amounts, since the amount of air filled in each of the cylinders #1 to #4 is the same, a reciprocal of an average value of fuel-air ratios of the air-fuel mixture to be a combustion target in each cylinder becomes a target air-fuel ratio. The fuel-air ratio is a reciprocal of the air-fuel ratio.

The setting of the reciprocal of the average value of the fuel-air ratios as a target air-fuel ratio is intended to control the exhaust gas components as desired. Hereinafter, in a case where a non-combustible fuel component and oxygen in exhaust gas can react without excess or deficiency, the exhaust gas air-fuel ratio is referred to as a stoichiometric air-fuel ratio. When an amount exceeding the amount of non-combustible fuel component in exhaust gas capable of reacting with oxygen without excess or deficiency is larger, the exhaust gas air-fuel ratio is referred to as rich, and when the amount exceeding the amount of non-combustible fuel component in exhaust gas capable of reacting with oxygen without excess or deficiency is smaller, the exhaust gas air-fuel ratio is referred to as lean. However, the term "excess amount" includes a case where the amount of non-combustible fuel component in exhaust gas is smaller than the amount capable of reacting with oxygen without excess or deficiency, and in this case, the excess amount becomes a negative amount. For example, an average value of the exhaust gas air-fuel ratios per combustion cycle is defined as an exhaust gas air-fuel ratio relating to the whole exhaust gas discharged from the cylinders #1 to #4.

Correction coefficient calculation processing M20 is processing for adding the injection amount correction request value α to "1" to calculate a correction coefficient of the requested injection amount Qd regarding a rich combustion cylinder. Dither correction processing M22 is processing for multiplying the requested injection amount Qd by the correction coefficient "1+α" to calculate an injection amount command value Q* of a cylinder # w to be a rich combustion cylinder. "w" means any one of "1" to "4".

Multiplication processing M24 is processing for multiplying the injection amount correction request value α by "−⅓", and correction coefficient calculation processing M26 is processing for adding an output value of the multiplication processing M24 to "1" to calculate a correction coefficient of the requested injection amount Qd regarding a lean combustion cylinder. Dither correction processing M28 is processing for multiplying the requested injection amount Qd by the correction coefficient "1−(α/3)" to calculate an injection amount command value Q* of cylinders # x, # y, # z to be a lean combustion cylinder. "x", "y", and "z" are any one of "1" to "4". However, it is assumed that "w", "x", "y", "z" are different from one another.

Injection amount operation processing M30 is processing for generating an operation signal MS1 of the fuel injection valve 18 of the cylinder # w to be a rich combustion cylinder based on the injection amount command value Q* output through the dither correction processing M22, outputting the operation signal MS1 to the fuel injection valve 18, and operating the fuel injection valve 18 such that the amount of fuel injected from the fuel injection valve 18 becomes an amount according to the injection amount command value Q*. The injection amount operation processing M30 is processing for generating an operation signal MS1 of the fuel injection valve 18 of each of the cylinders # x, # y, # z to be a lean combustion cylinder based on the injection amount command value Q* output through the dither correction processing M28, outputting the operation signal MS1 to the fuel injection valve 18, and operating the fuel injection valve 18 such that the amount of fuel injected from the fuel injection valve 18 becomes an amount according to the injection amount command value Q*.

Deposition amount calculation processing M32 is processing for calculating and outputting the amount (hereinafter, referred to as a "PM deposition amount DPM") of PM trapped on the GPF 26 based on the difference pressure ΔP and the intake air amount Ga. The deposition amount calculation processing M32 is processing for setting the PM deposition amount DPM in a case where the difference pressure ΔP is high to a value greater than in a case where the difference pressure ΔP is low, and setting the PM deposition amount DPM in a case where the intake air amount Ga is large to a value smaller than in a case where the intake air amount Ga is small. In detail, map data with the difference pressure ΔP and the intake air amount Ga as an input variable and the PM deposition amount DPM as an output variable is stored in the ROM 34, and map calculation of the PM deposition amount DPM is performed by the CPU 32. Map data is set data of discrete values of the input variables and a value of the output variable corresponding to each of the values of the input variables. The map calculation may be, for example, processing for, in a case where the value of the input variable coincide with any one of the values of the input variables of map data, defining the value of the output variable of corresponding map data as a calculation result, and in a case where the value of the input variable does not coincide with any one of the values of the input variables of map data, defining a value obtained by interpolation of values of a plurality of output variables included in map data as a calculation result.

Filter temperature calculation processing M34 is processing for calculating a temperature (hereinafter, referred to as a "filter temperature Tgpf") of the GPF 26 based on the rotation speed NE, a load factor KL, and the injection amount correction request value α. In detail, the filter temperature calculation processing M34 is processing for calculating a base temperature Tb based on the rotation speed NE and the load factor KL, and increasing and correcting the base temperature Tb based on the injection amount correction request value α to calculate the filter temperature Tgpf. In a case where the dither control is not executed, the base temperature Tb is an estimated value of the temperature of the GPF 26 in a steady state in which fluctuation of an operation point of the internal combustion engine 10 determined by the rotation speed NE and the load factor KL is negligible. In a case where the dither control is executed, the temperature of exhaust gas downstream of the three-way catalyst 24 increases more than in a case where the dither control is not executed due to heat of reaction of non-combustible fuel discharged from a rich combustion cylinder and oxygen discharged from a lean combustion cylinder in the three-way catalyst 24. The amount of increase of the temperature of exhaust gas downstream of the three-way catalyst 24 due to the dither control becomes greater in a case where the injection amount correction request value α is large than in a case where the injection amount correction request value α is small. For this reason, the filter temperature Tgpf is calculated by increasing and correcting the base temperature Tb according to the injection amount correction request value α. In detail, the base temperature Tb is calculated by storing map data with the rotation speed NE and the load factor KL as an input variable and the base temperature Tb as an output variable in the ROM 34, and performing map calculation in the CPU 32. The filter temperature Tgpf is calculated by storing map data with the injection amount correction request value α as an input variable and the amount of temperature increase as an output variable in the ROM 34, performing map calculation of the amount of temperature increase in the CPU 32, and approaching the filter temperature Tgpf toward an amount obtained by adding the amount of temperature increase to the base temperature Tb over time. Specifically, the CPU 32 calculates the filter temperature Tgpf through index moving average processing of the amount obtained by adding the amount of temperature increase to the base temperature Tb and the filter temperature Tgpf.

Incidentally, the load factor KL is a parameter indicating the amount of air that fills the combustion chamber 16, and is calculated based on the intake air amount Ga by the CPU 32. The load factor KL is the ratio of an inflow air amount per combustion cycle of one cylinder to a reference inflow air amount. Incidentally, the reference inflow air amount may be an amount that is variably set according to the rotation speed NE.

Figure 3:
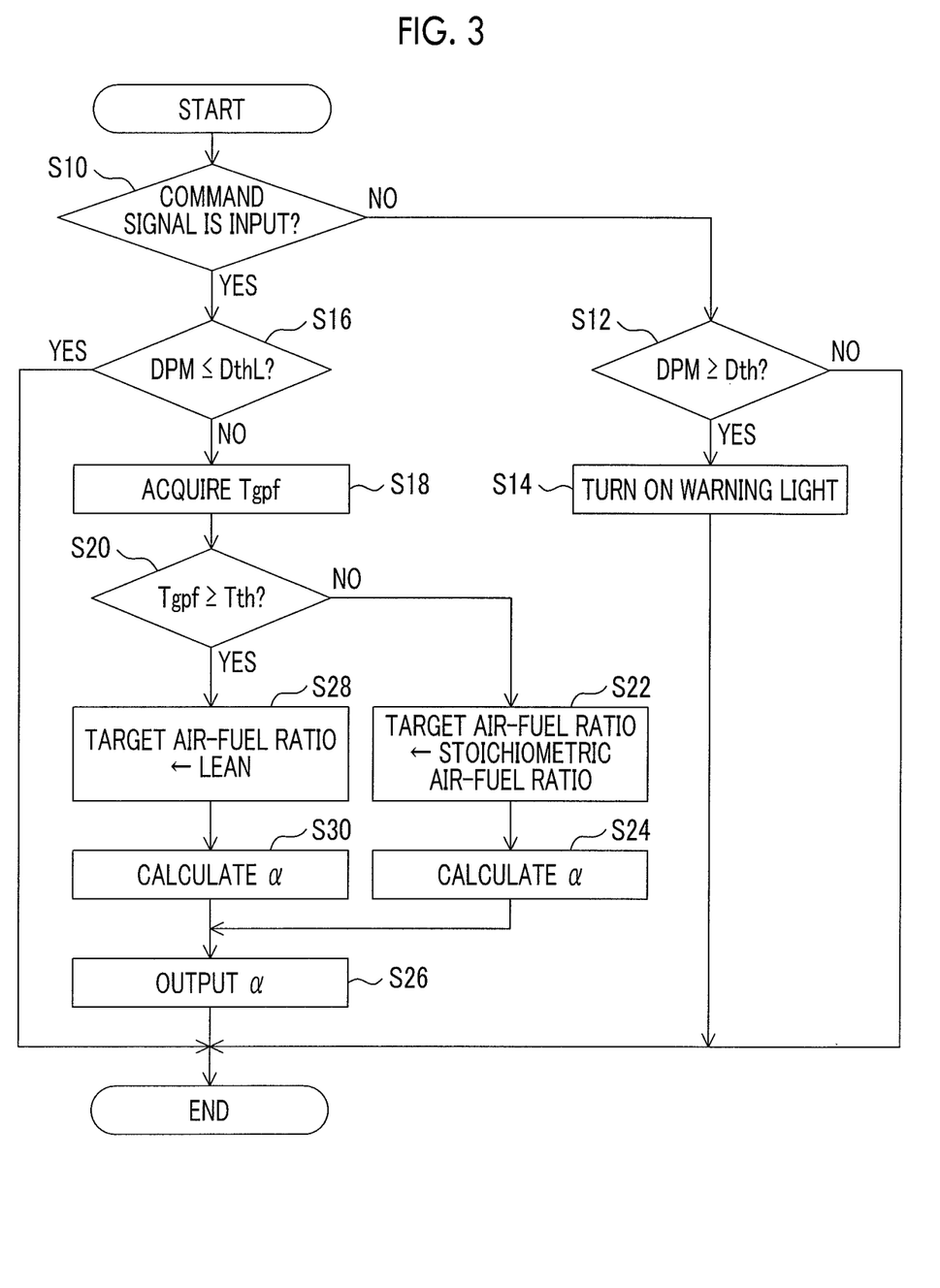
FIG. 3 is a flowchart showing a procedure of request value output processing according to the embodiment.

In the request value output processing M18, the injection amount correction request value α is set to a value greater than "0" according to the PM deposition amount DPM for regeneration processing (filter regeneration processing) of the GPF 26. FIG. 3 shows a procedure of the request value output processing M18. The processing shown in FIG. 3 is realized by the CPU 32 executing the program stored in the ROM 34 repeatedly in a predetermined cycle, for example. Hereinafter, a step number is expressed by a numeral with "S" attached to the head.

In a sequence of processing shown in FIG. 3, the CPU 32 determines whether or not an execution command signal of filter regeneration processing for repairing the GPF 26 is input to the electronic control unit 30 from the outside (S10). It is assumed that, in a state in which dedicated abnormality countermeasure equipment (hereinafter, referred to as "maintenance equipment") is connected to the electronic control unit 30 by a worker of a repair shop, the command signal is input from the maintenance equipment to the electronic control unit 30. That is, the processing of S10 is processing for determining whether or not a vehicle should leave a user and be subjected to the filter regeneration processing by the worker of the repair shop.

In a case where determination is made that the command signal is not input (S10: NO), the CPU 32 determines whether or not the PM deposition amount DPM is equal to or greater than a specified amount Dth (S12). The specified amount Dth is set to a value that, in a case where the PM deposition amount DPM is considerably large and is left as it is, may impair the operation of the internal combustion engine 10. In a case where determination is made that the PM deposition amount DPM is equal to or greater than the specified amount Dth (S12: YES), the CPU 32 operates a warning light 50 shown in FIG. 1 and executes processing for prompting the user of the vehicle mounted with the internal combustion engine 10 to take the filter regeneration processing in the repair shop since the PM deposition amount DPM is large (S14).

In a case where determination is made that the command signal is input (S10: YES), the CPU 32 determines whether or not the PM deposition amount DPM is equal to or less than a predetermined amount DthL smaller than the specified amount Dth (S16). In a case where determination is made that the PM deposition amount DPM is greater than the predetermined amount DthL (S16: NO), the CPU 32 acquires the filter temperature Tgpf (S18). The CPU 32 determines whether or not the filter temperature Tgpf is equal to or higher than a predetermined temperature Tth (S20). The predetermined temperature Tth is set to a temperature (for example, equal to or higher than 550° C.) at which oxygen is supplied to the GPF 26 to combust particulate matter trapped on the GPF 26.

In a case where determination is made that the filter temperature Tgpf is lower than the predetermined temperature Tth (S20: NO), the CPU 32 sets the target air-fuel ratio to the stoichiometric air-fuel ratio (S22). This is a setting for controlling the average value of the exhaust gas air-fuel ratios of the cylinders #1 to #4 to the stoichiometric air-fuel ratio. The CPU 32 calculates the injection amount correction request value α based on the rotation speed NE and the load factor KL (S24), and outputs the injection amount correction request value α (S26). In a case where determination is made that the filter temperature Tgpf is equal to or higher than the predetermined temperature Tth (S20: YES), the CPU 32 sets the target air-fuel ratio to be leaner than the stoichiometric air-fuel ratio (S28). This is a setting for controlling the average value of the exhaust gas air-fuel ratios of the cylinders #1 to #4 to be leaner than the stoichiometric air-fuel ratio, and supplying oxygen to the GPF 26. The CPU 32 calculates the injection amount correction request value α based on the rotation speed NE and the load factor KL (S30), and outputs the injection amount correction request value α (S26).

In a case where the processing of S14 and S26 is completed, in a case where determination is made to be negative in the processing of S12, or in a case where determination is made to be affirmative in the processing of S16, the CPU 32 ends a sequence of processing shown in FIG. 3 once.

In the processing of S24 and S30, the CPU 32 performs map calculation of the injection amount correction request value α using map data stored in advance in the ROM 34 with the rotation speed NE and the load factor KL as an input variable and the injection amount correction request value α as an output variable.

Figure 4:
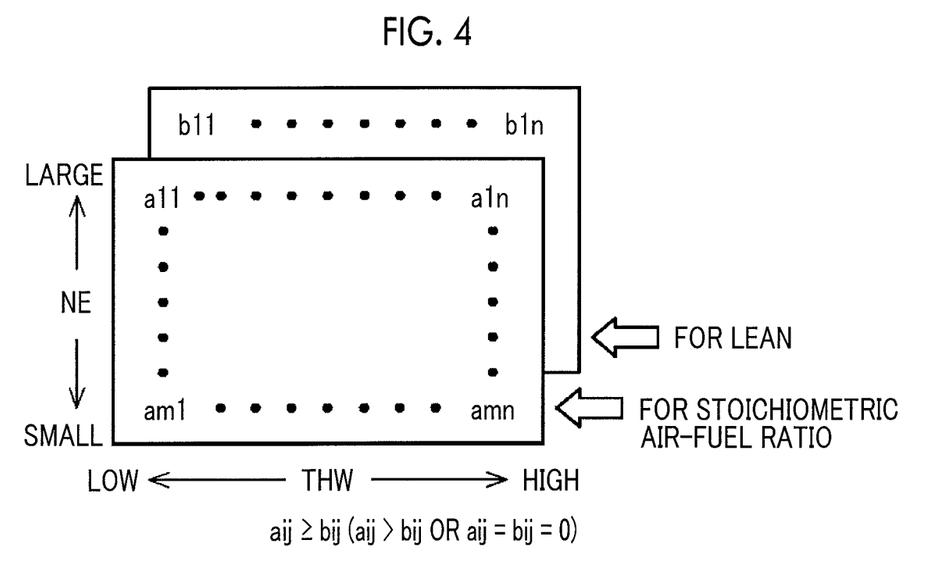
FIG. 4 is a diagram showing map data of an injection amount correction request value according to the embodiment.

Map data is shown in FIG. 4. As shown in FIG. 4, an output variable aij (i=1 to m, j=1 to n) of map data for use in the processing of S24 is equal to or greater than an output variable bij of map data for use in the processing of S30. In detail, at a specific operation point, the output variable aij and the output variable bij are equal to each other, and the values of the output variable aij and the output variable bij are zero. This corresponds to an operation point that is not appropriate for the filter regeneration processing. That is, among the operation points, there is an operation point where it is difficult to increase the temperature of the GPF 26 to a temperature appropriate for the filter regeneration processing. In the above-described operation point, since the dither control is not executed, the output variable is zero. In contrast, in a case where the output variable aij of map data for use in the processing of S24 is not zero, the output variable aij is a value greater than the output variable bij of map data for use in the processing of S30. This is because, since the processing of S30 is to determine the injection amount correction request value α when the target air-fuel ratio is leaner than the stoichiometric air-fuel ratio, the injection amount correction request value α cannot be a considerably large value in order to restrain the air-fuel ratio of the lean combustion cylinder from reaching a lean-side misfire limit as a lower limit value causing misfire.

In the embodiment, "K·aij=bij" cannot be expressed using a single correction coefficient K(<1) at all operation points determined by a variable (i,j). That is, in a case where "K·ast=bst" at a specific operation point specified by (s,t), an equation "K·aij=bij" may not be established at other operation points.

Figure 5:
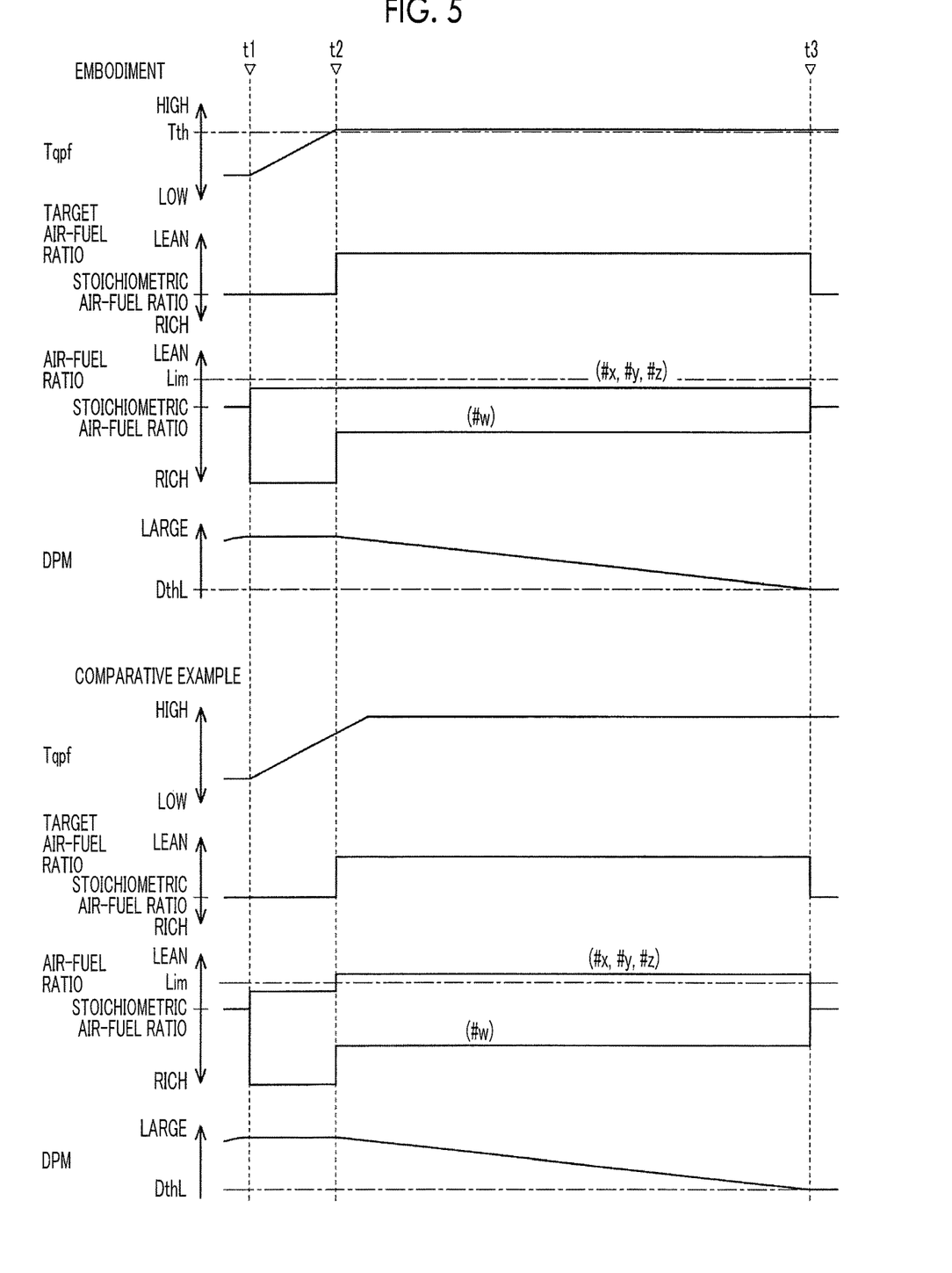
FIG. 5 is a time chart showing effects of the embodiment.

The operation of the embodiment will be described. FIG. 5 illustrates transition of the filter temperature Tgpf, the target air-fuel ratio, the air-fuel ratios of the cylinders #1 to #4, and the PM deposition amount DPM in the embodiment and a comparative example in which the dither control is executed solely using map data for use in the processing of S24.

As shown in FIG. 5, at time t1, in a case where the dither control is started, the air-fuel ratio of the cylinder # w to be a rich combustion cylinder is richer than the stoichiometric air-fuel ratio, and the air-fuel ratio of each of the cylinders # x, # y, # z to be a lean combustion cylinder is leaner than the stoichiometric air-fuel ratio. With this, the filter temperature Tgpf increases. At time t2, in a case where the filter temperature Tgpf reaches the predetermined temperature Tth, the target air-fuel ratio is brought into a lean state, oxygen is supplied to the GPF 26, and with this, particulate matter trapped on the GPF 26 are combusted. After time t2, the injection amount correction request value α becomes smaller than before time t2. FIG. 5 illustrates that the air-fuel ratio of each of the cylinders # x, # y, # z to be a lean combustion cylinder is not changed before and after time t2. After time t2, the target air-fuel ratio is brought into the lean state. This means that the injection amount correction request value α becomes small after time t2. The injection amount correction request value α becomes small, and thus, even after time t2, the air-fuel ratio of each of the cylinders # x, # y, # z to be a lean combustion cylinder does not reach a lean-side misfire limit Lim. The injection amount correction request value α becomes small, and thus, a temperature increase effect of the dither control is lowered; however, in FIG. 5, this is expressed as the filter temperature Tgpf being not increased.

In contrast, in a case of the comparative example, after time t2, the air-fuel ratio of each of the cylinders # x, # y, # z to be a lean combustion cylinder exceeds the lean-side misfire limit Lim. With this, combustion becomes unstable, and in the worst case, misfire is cased. In contrast, for example, after time t2, in a case where the dither control is stopped, the temperature of the GPF 26 falls below the predetermined temperature Tth, and the filter regeneration processing may not be executed.

In FIG. 5, a configuration in which the air-fuel ratio of each of the cylinders # x, # y, # z to be a lean combustion cylinder is not changed before and after time t2 is not indispensable. According to the embodiment described above, the following effects are further obtained.

(1) Map data for use in the processing of S24 and map data for use in the processing of S30 are separately stored in the ROM 34. With this, in comparison of the processing of S30 with processing for reducing the injection amount correction request value α determined by map data for use in the processing of S24 at a predetermined reduction ratio, the injection amount correction request value α can be set to an extremely large value in the processing of S30. That is, at an operation point where the air-fuel ratio of the lean combustion cylinder according to the injection amount correction request value α calculated in the processing of S24 has a certain amount of margin with respect to the lean-side misfire limit Lim, the injection amount correction request value α of S30 can be made large.

(2) Switching from the processing of S24 to the processing of S30 is performed under a condition that the filter temperature Tgpf becomes the predetermined temperature Tth. With this, it is possible to execute the dither control processing having a high temperature increase effect until the filter temperature Tgpf falls within a temperature range appropriate for the regeneration processing, and consequently, to make the filter temperature Tgpf quickly reach a temperature range appropriate for the regeneration processing.

(3) The dither control is executed under a condition that the execution command signal of the filter regeneration processing is input for repairing from the outside of the electronic control unit 30 by the worker of the repair shop. With this, the average value of the exhaust gas air-fuel ratios is easily controlled to be leaner than the stoichiometric air-fuel ratio compared to during normal use of the user. Since rotational fluctuation of the crankshaft is easily permitted to be made large, it is possible to make the injection amount correction request value α large, in particular, in the processing of S24.

In the embodiment, the GPF 26 is an example of a filter, and in a case where determination is made to be negative in the processing of S16 and the injection amount correction request value α is greater than zero, the correction coefficient calculation processing M20, the dither correction processing M22, the multiplication processing M24, the correction coefficient calculation processing M26, the dither correction processing M28, and the injection amount operation processing M30 are an example of dither control processing. A first mode is an example of dither control processing in a case where the injection amount correction request value α is calculated as a value greater than zero through the processing of S24, and a second mode is an example of dither control processing in a case where the injection amount correction request value α is calculated as a value greater than zero through the processing of S30. The processing of S18 is an example of temperature acquisition processing, and the processing of S20 to S24, S28, and S30 is an example of switching processing.

Other Embodiments

At least one of the elements of the embodiment may be modified as follows.

First Mode and Second Mode

In the embodiment, although the output variable aij of map data for the first mode (for the processing of S24) is set to be indispensably made greater than the output variable bij of map data for the second mode (for the processing of S30) at the operation point where the dither control is executed, the disclosure is not limited thereto. For example, the values of the output variables may become equal to each other at a part of operation points.

In the embodiment, as shown in FIG. 4, although map data for the first mode (for the processing of S24) and map data for the second mode (for the processing of S30) are provided separately, the disclosure is not limited thereto. For example, map data for the first mode and lean-side misfire limit information may be provided, and for the processing of S30, a value calculated from map data for the first mode may be subjected to upper limit guard processing according to the lean-side misfire limit. This can be realized, for example, by storing, as an upper limit guard value, a value slightly smaller than an injection amount correction request value when the air-fuel ratio of the lean combustion cylinder becomes the lean-side misfire limit when the target air-fuel ratio is brought into the lean state. At this time, the upper limit guard value may be set to a fixed value. However, in a case where the upper limit guard value is variably set according to the rotation speed NE and a load, it is possible to set the injection amount correction request value α calculated through the processing of S30 to an extremely large value compared to a case where the upper limit guard value is not variably set according to the rotation speed NE and the load. In addition, for example, the processing of S30 may be processing for reducing a value calculated from map data for the first mode at a predetermined reduction ratio by multiplying the value calculated from map data for the first mode by a correction coefficient smaller than "1".

In the embodiment, although, in a case where the filter temperature Tgpf is lower than the predetermined temperature Tth, the average value of the exhaust gas air-fuel ratios of the cylinders #1 to #4 is controlled to the stoichiometric air-fuel ratio, the disclosure is not limited thereto. For example, the average value may be controlled to be richer than when the filter temperature Tgpf becomes equal to or higher than the predetermined temperature Tth, but leaner than the stoichiometric air-fuel ratio.

In the embodiment, although switching from the processing of S22 and S24 to the processing of S28 and S30 is performed under a condition that the filter temperature Tgpf becomes equal to or higher than the predetermined temperature Tth, the disclosure is not limited thereto. For example, switching from the processing of S22 and S24 to the processing of S28 and S30 may be performed under a condition that an execution time of the dither control becomes a predetermined time.

Purpose of Second Mode

In the embodiment, although the second mode where the injection amount correction request value α is restricted to be small is used in order to restrain the air-fuel ratio of the lean combustion cylinder from reaching the lean-side misfire limit Lim because the average value of the exhaust gas air-fuel ratios is brought into the lean state, the disclosure is not limited thereto. For example, in a case where the dither control having an extremely high temperature increase effect for quickly increasing the temperature of the GPF 26 to a temperature appropriate for the filter regeneration processing in the first mode is executed, when the execution of the dither control is continued, the temperature of the GPF 26 may excessively increase. In this case, the temperature of the GPF 26 becomes a temperature appropriate for the filter regeneration processing, whereby it is effective to perform switching to the dither control of the second mode having a small temperature increase effect.

Command Signal of Execution for Repairing

In the embodiment, although a case where the maintenance equipment is connected to the electronic control unit 30 and the execution command signal is input from the maintenance equipment to the electronic control unit 30, the disclosure is not limited thereto. For example, a prescribed operation state unexpected from a normal operation of the user, such as an operation to simultaneously depress an accelerator and a brake when a shift lever is in a neutral position may be the input of the execution command signal of the regeneration processing.

PM Deposition Amount

In the embodiment, although the PM deposition amount DPM is calculated through map calculation based on the difference pressure ΔP and the intake air amount Ga, the disclosure is not limited thereto. For example, in a case where the intake air amount Ga is equal to or greater than a specified value, the map calculation is performed, and in a case where the intake air amount Ga is less than the specified value, the PM deposition amount DPM may be estimated based on the rotation speed NE, the load factor KL, a temperature (hereinafter, referred to as a "coolant temperature THW") of a coolant of the internal combustion engine 10, and the air-fuel ratio Af. The rotation speed NE, the load factor KL, the coolant temperature THW, and the air-fuel ratio Af can be executed as follows, for example. That is, map data with the rotation speed NE and the load factor KL as an input variable and an PM deposition increase amount per unit time as an output variable, map data with the coolant temperature THW as an input variable and a coolant temperature correction coefficient as an output variable, and map data with the air-fuel ratio Af as an input variable and an air-fuel ratio correction coefficient as an output variable are stored in the ROM 34. After map calculation of each of the PM deposition increase amount, the coolant temperature correction coefficient, and the air-fuel ratio correction coefficient is performed by the CPU 32, the PM deposition increase amount is corrected by multiplying the PM deposition increase amount by the coolant temperature correction coefficient and the air-fuel ratio correction coefficient, and the PM deposition amount DPM is successively increased and corrected with the corrected PM deposition increase amount. In a case where transition is made to a state in which the intake air amount Ga is equal to or greater than the specified value to a state in which the intake air amount Ga is less than the specified value, an initial value of the PM deposition amount DPM may be a value calculated based on the difference pressure ΔP. In a case where switching is performed from the state in which the intake air amount Ga is less than the specified value to the state in which the intake air amount Ga is equal to or greater than the specified value, the PM deposition amount DPM calculated based on the difference pressure ΔP may be used.

The PM deposition amount DPM may be estimated by successively integrating the PM deposition increase amount corrected with the coolant temperature correction coefficient and the air-fuel ratio correction coefficient under a condition that the filter temperature Tgpf is less than the predetermined temperature Tth, without depending on the difference pressure ΔP. In this case, in a case where the filter temperature Tgpf is equal to or higher than the predetermined temperature Tth and in a case where oxygen is supplied to the GPF 26, the PM deposition amount DPM may be reduced and corrected. This can be realized by successively calculating a reduction correction amount according to the filter temperature Tgpf and the PM deposition amount DPM, and reducing and correcting the PM deposition amount with the reduction correction amount. It is preferable that, in a case where the filter temperature Tgpf is high, the reduction correction amount is greater than in a case where the filter temperature Tgpf is low, and in a case where the PM deposition amount DPM is large, the reduction correction amount is greater than in a case where the PM deposition amount DPM is small. This can be realized by storing map data with the filter temperature Tgpf and the PM deposition amount DPM as an input variable and the reduction correction amount as an output variable in the ROM 34, and performing map calculation of the reduction correction amount in the CPU 32.

The PM deposition amount DPM may be detected using a dedicated sensor.

Acquisition Processing

In the embodiment, although the estimated filter temperature Tgpf is acquired and used, the disclosure is not limited thereto, and for example, a temperature sensor, such as a thermocouple, may be provided in the GPF 26, and a detection value of the temperature sensor may be acquired and used.

Dither control processing that is executed when condition of occurrence of regeneration request of filter is established.

In the embodiment, although the filter regeneration processing is executed under a condition that the execution command signal from the worker of the repair shop is input, the disclosure is not limited thereto. For example, in a case where the PM deposition amount DPM is equal to or greater than a predetermined amount smaller than the specified amount Dth, and the internal combustion engine 10 is in a high load operation, the filter regeneration processing may be executed by executing the dither control processing while making the injection amount correction request value α be a value smaller than in the embodiment. Even in this case, the first mode and the second mode may be provided, and the target air-fuel ratio of the second mode may be brought into the lean state; however, the second mode may not be provided, and after the filter temperature Tgpf becomes equal to or higher than the predetermined temperature Tth, particulate matter in the GPF 26 may be combusted using oxygen being supplied to the GPF 26 with fuel cut-off processing.

Dither Control Processing

In the embodiment, although the injection amount correction request value α is calculated from the two parameters of the rotation speed NE and the load factor KL, the disclosure is not limited thereto. For example, the injection amount correction request value α may be calculated based on the coolant temperature THW, in addition to the rotation speed NE and the load factor KL. In addition, the PM deposition amount DPM may be additionally used. Of course, the use of the rotation speed NE and the load factor KL are not indispensable. For example, the injection amount correction request value α may be variably set based on solely at least one parameter among the four parameters of the PM deposition amount DPM, the coolant temperature THW, the rotation speed NE, and the load factor KL. For example, an accelerator operation amount as a load may be used instead of using the rotation speed NE and the load factor KL as a parameter for specifying an operation point of the internal combustion engine 10 and in place of the load factor KL as a load. The injection amount correction request value α may be variably set based on the intake air amount Ga, in place of the rotation speed NE and the load.

A configuration in which the injection amount correction request value α is variably set to a value greater than "0" at an operation point where the dither control is executed is not indispensable. For example, a single value greater than zero for the processing of S24 and a single value greater than zero for the processing of S30 may be determined at an operation point where the dither control is executed.

In the embodiment, although the number of lean combustion cylinders is greater than the number of rich combustion cylinders, the disclosure is not limited thereto. For example, the number of rich combustion cylinders and the number of lean combustion cylinders may be equal to each other. Furthermore, for example, all cylinders #1 to #4 are not limited to a lean combustion cylinder and a rich combustion cylinder, and for example, an air-fuel ratio of one cylinder may be set as the target air-fuel ratio. A configuration in which, in a case where an in-cylinder filled air amount is the same in one combustion cycle, the reciprocal of the average value of the fuel-air ratios becomes the target air-fuel ratio is not indispensable. For example, in a case of the four cylinders as in the embodiment, when the in-cylinder filled air amount is the same, the reciprocal of the average value of the fuel-air ratios may become the target air-fuel ratio in five strokes or the reciprocal of the average value of the fuel-air ratios may become the target air-fuel ratio in three strokes. However, it is preferable that a period during which there are both of the rich combustion cylinder and the lean combustion cylinder in one combustion cycle occurs once or more in at least two combustion cycles. In other words, when the reciprocal of the average value of the fuel-air ratios is set as the target air-fuel ratio in a case where the in-cylinder filled air amount is the same in a predetermined period, it is preferable that the predetermined period is set to be equal to or less than two combustion cycles. For example, in a case where there is a rich combustion cylinder solely once for two combustion cycles with the predetermined period as the two combustion cycles, an appearance order of the rich combustion cylinder and the lean combustion cylinder becomes, for example, "R, L, L, L, L, L, L, L" when the rich combustion cylinder is referred to as R and the lean combustion cylinder is referred to as L. In this case, a period of "R, L, L, L" is provided in a period of one combustion cycle shorter than the predetermined period, at least one cylinder among the cylinders #1 to #4 becomes a lean combustion cylinder, and other cylinders become a rich combustion cylinder. However, in a case where the reciprocal of the average value of the fuel-air ratios is set as the target air-fuel ratio in a period different from one combustion cycle, it is preferable that the amount of air sucked by the internal combustion engine in an intake stroke once and partially blown back to the intake passage until an intake valve is closed is negligible.

Exhaust Gas Control Apparatus

In the embodiment, although the upstream exhaust gas control apparatus is the three-way catalyst 24 and the downstream exhaust gas control apparatus is the GPF 26, the disclosure is not limited thereto. For example, the upstream exhaust gas control apparatus may be a GPF and the downstream exhaust gas control apparatus may be a three-way catalyst. In the above-described configuration, although the three-way catalyst 24 and the GPF 26 are illustrated as an exhaust gas control apparatus, the disclosure is not limited thereto. For example, solely the GPF 26 may be provided. However, in a case where a catalyst having oxygen storage ability is not provided upstream of the GPF, it is preferable that the GPF is given oxygen storage ability in order to increase temperature increase ability through the dither control.

Control Device

The control device is not limited to the control device that includes the CPU 32 and the ROM 34, and executes software processing. For example, a dedicated hardware circuit (for example, Application Specific Integrated Circuit (ASIC) or the like) that hardware-processes at least a part of the processing subjected to software processing in the embodiments may be provided. That is, the control device may have a configuration of (a) to (c) described below. (a) A processing device that executes the entire processing according to a program, and a program storage device such as a ROM that stores the program are provided. (b) A processing device that executes a part of the processing according to a program, a program storage device, and a dedicated hardware circuit that executes the remaining processing are provided. (c) A dedicated hardware circuit that executes the entire processing is provided. Here, a plurality of software processing circuits each including the processing device and the program storage device or a plurality of dedicated hardware circuits may be provided. That is, the processing may be executed by a processing circuit including at least one of one or a plurality of software processing circuits and one or a plurality of dedicated hardware circuits.

Internal Combustion Engine

The internal combustion engine is not limited to a four-cylinder internal combustion engine. For example, the internal combustion engine may be an in-line six-cylinder internal combustion engine. For example, the internal combustion engine may be a V type internal combustion engine that includes a first exhaust gas control apparatus and a second exhaust gas control apparatus, and has different cylinders where exhaust gas is removed by the first exhaust gas control apparatus and the second exhaust gas control apparatus.

OTHERS

The fuel injection valve is not limited to a valve that injects fuel to the combustion chamber 16, and for example, may be a valve that injects fuel to the intake passage 12. A configuration in which air-fuel ratio feedback control is executed at the time of the execution of the dither control is not indispensable.

Although the embodiment of the disclosure has been described above in detail, the disclosure is not limited to the above-described embodiment, and various modifications or alterations may be made without departing from the spirit and scope of the disclosure described in the claims.

What is claimed is:

1. A control device for an internal combustion engine including a plurality of cylinders, a filter configured to trap particulate matter in exhaust gas discharged from the cylinders, and a fuel injection valve provided in each of the cylinders,
the control device comprising an electronic control unit configured to execute dither control processing, the dither control processing including a first mode, and a second mode that is executed after the first mode, the dither control processing being processing during a period for operating the fuel injection valve such that at least one cylinder among the cylinders becomes a lean combustion cylinder having an air-fuel ratio leaner than a stoichiometric air-fuel ratio, and cylinders different from the at least one cylinder among the cylinders become a rich combustion cylinder having an air-fuel ratio richer than the stoichiometric air-fuel ratio when a condition that a regeneration request of the filter occurs is established, and in the second mode, an absolute value of the difference between the air-fuel ratio in the lean combustion cylinder and the air-fuel ratio in the rich combustion cylinder being smaller than in the first mode, and the dither control processing further including controlling an average value of exhaust gas air-fuel ratios for all cylinders in a predetermined period including the period to a target air-fuel ratio, with the average value in the second mode being leaner than the average value in the first mode.

2. The control device according to claim 1, wherein:
the dither control processing includes processing for variably setting the difference between the air-fuel ratio in the lean combustion cylinder and the air-fuel ratio in the rich combustion cylinder using map data with a rotation speed of a crankshaft of the internal combustion engine and a load of the internal combustion engine as input variables; and
the map data includes map data for the first mode and map data for the second mode.

3. The control device according to claim 1, wherein:
the electronic control unit is configured to execute temperature acquisition processing for acquiring a temperature of the filter; and
the dither control processing includes switching processing for switching from the first mode to the second mode when a condition that the temperature of the filter becomes a predetermined temperature is established.

4. The control device according to claim 1, wherein the electronic control unit is configured to execute the dither control processing when a condition that an execution command signal of regeneration processing of the filter is input to repair the filter from the outside of the electronic control unit is established.

5. A control method for an internal combustion engine including a plurality of cylinders, a filter configured to trap particulate matter in exhaust gas discharged from the cylinders, and a fuel injection valve provided in each of the cylinders, the control method comprising:
executing, by an electronic control unit, dither control processing in a first mode; and
executing, by the electronic control unit, the dither control processing in a second mode after the execution of the dither control processing in the first mode, wherein the dither control processing is processing during a period for operating the fuel injection valve such that at least one cylinder among the cylinders becomes a lean combustion cylinder having an air-fuel ratio leaner than a stoichiometric air-fuel ratio, and cylinders different from the at least one cylinder among the cylinders become a rich combustion cylinder having an air-fuel ratio richer than the stoichiometric air-fuel ratio when a condition that a regeneration request of the filter occurs is established, and in the second mode, an absolute value of the difference between the air-fuel ratio in the lean combustion cylinder and the air-fuel ratio in the rich combustion cylinder is smaller than in the first mode, and the dither control processing further including controlling an average value of exhaust gas air-fuel ratios for all cylinders in a predetermined period including the period to a target air-fuel ratio, with the average value in the second mode being leaner than the average value in the first mode.

* * * * *